March 24, 1953 W. B. EWING 2,632,507
STILELESS SCREEN MOUNTING
Filed Sept. 16, 1949 3 Sheets-Sheet 1
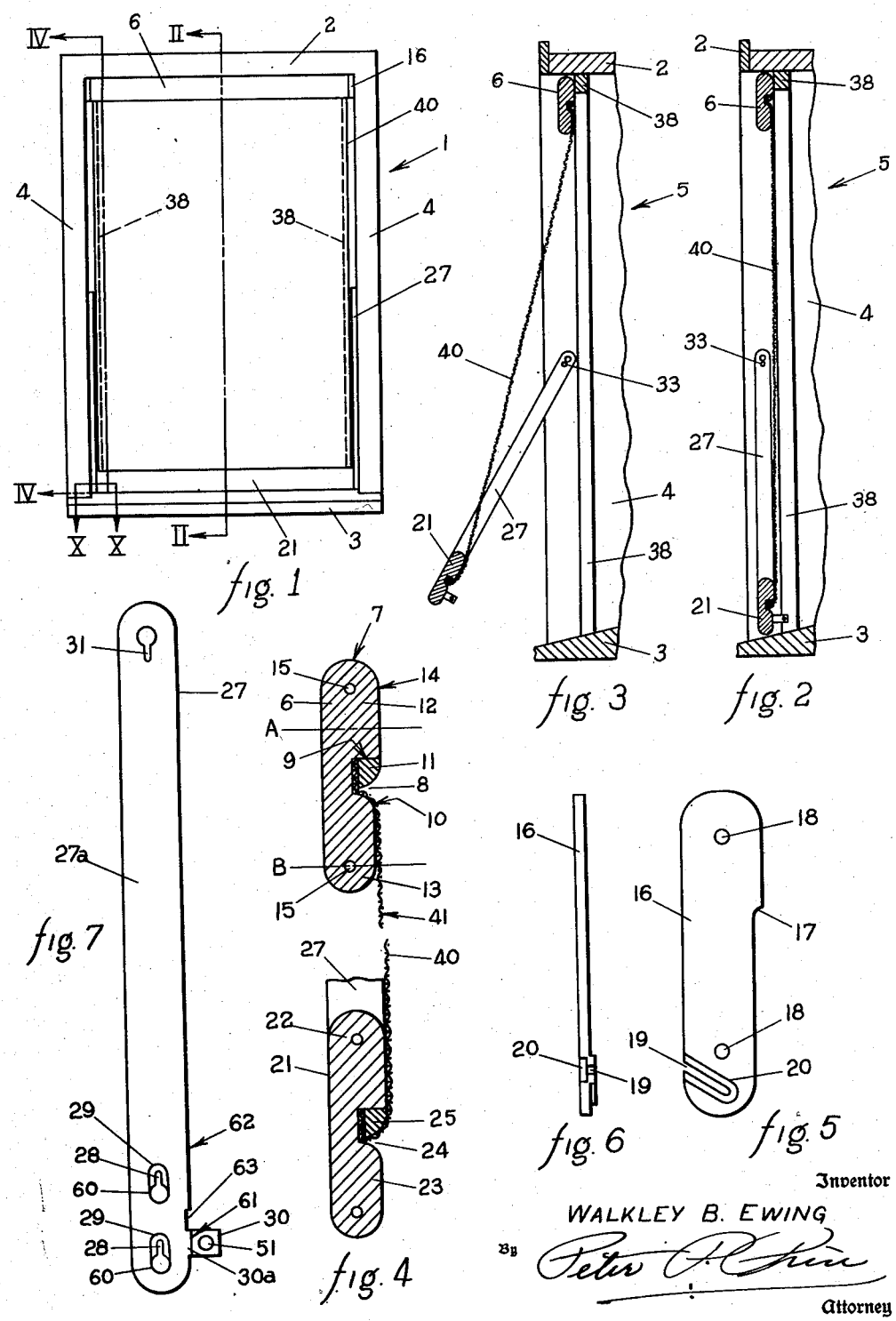
Inventor
WALKLEY B. EWING
By Peter
Attorney March 24, 1953     W. B. EWING     2,632,507
STILELESS SCREEN MOUNTING
Filed Sept. 16, 1949     3 Sheets-Sheet 2
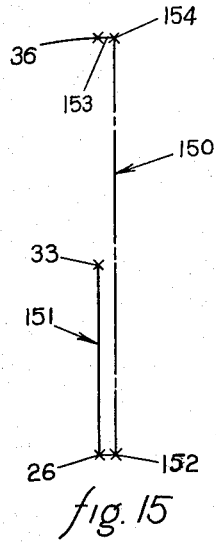
fig. 15
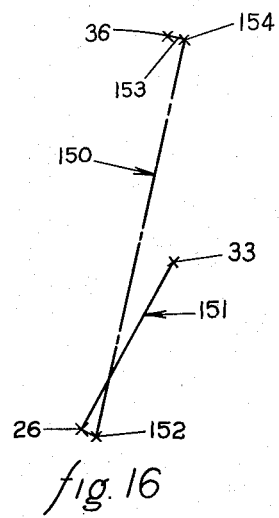
fig. 16
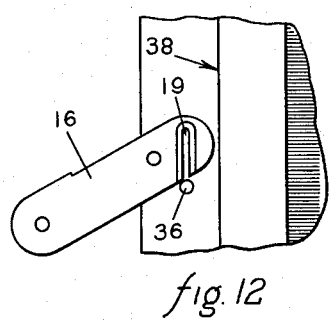
fig. 12
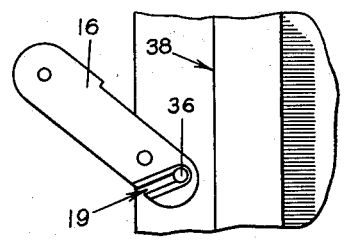
fig. 13
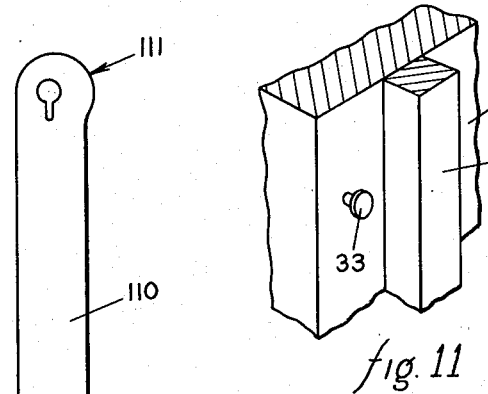
fig. 11
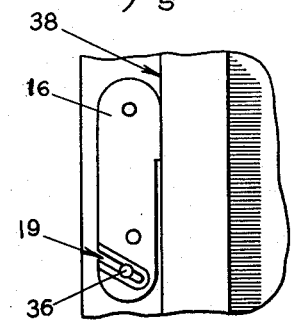
fig. 14
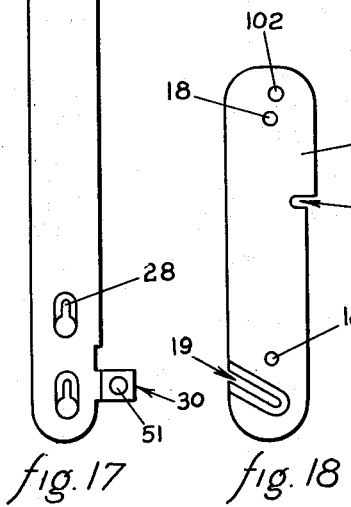
fig. 17
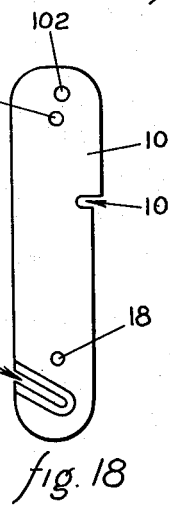
fig. 18
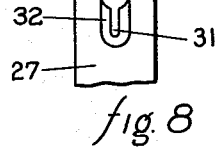
fig. 8
Inventor
WALKLEY B. EWING
By
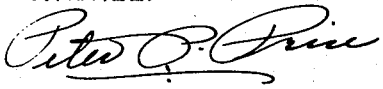
Attorney March 24, 1953      W. B. EWING      2,632,507
STILELESS SCREEN MOUNTING
Filed Sept. 16, 1949      3 Sheets-Sheet 3
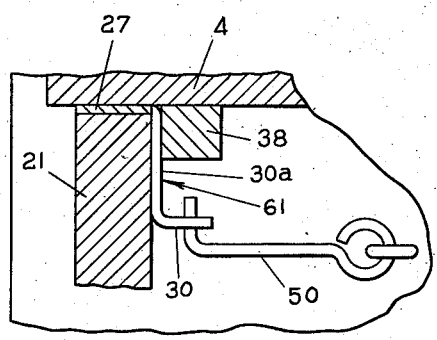
fig. 10
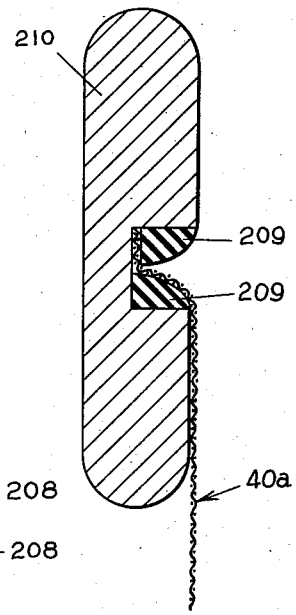
fig. 22
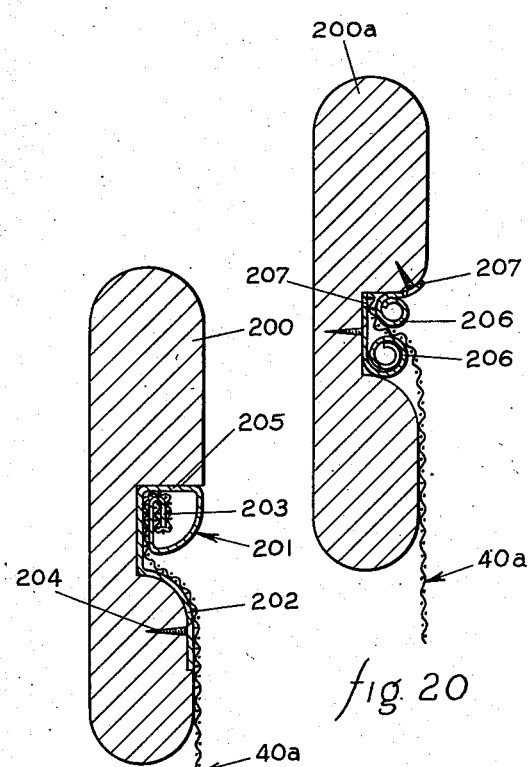
fig. 21
fig. 20
fig. 19
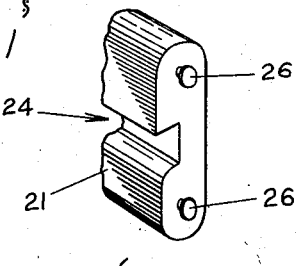
fig. 9
Inventor
WALKLEY B. EWING
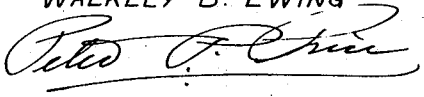
By
Attorney Patented Mar. 24, 1953

2,632,507

UNITED STATES PATENT OFFICE 2,632,507

STILELESS SCREEN MOUNTING

Walkley B. Ewing, Grand Rapids, Mich., assignor to Ewing Development Company, Grand Rapids, Mich., a corporation of Michigan Application September 16, 1949, Serial No. 116,120

7 Claims. (Cl. 160—328)

This invention relates to the art of mounting screening material and more particularly to a stileless frame for mounting screening material adapted to tension the screen as it is moved into position in the window.

Insect and sun screening, when mounted by any of the several conventional methods developed prior to my invention, does not operate satisfactorily. The web of screen, when mounted, is tensioned both longitudinally and transversely, thus inducing it to stretch in both directions. The degree of tension imposed is normally small due to the limitations of mounting in a conventional frame. The difficulty, in part, arises from the tendency of the screen to stretch to a greater or lesser degree after framing. This stretching results in bulges and similar unsatisfactory conditions. These bulges, once having appeared, cannot be removed because the screening normally stretches to form a dome-shaped bubble which no amount of retensioning will eliminate. Further, unsatisfactory conditions also result from loosening of the screen from the frame.

Long recognition of the unsatisfactory results obtained by conventional frames has produced certain developments directed toward the stileless mounting of screening, tensioned in one direction only. These developments have not been entirely satisfactory for several reasons. They do not seal the window opening because they failed to seat positively the screening against the blind stops of the window. Many of these previous developments depend upon threaded means to obtain their tension. When a coarse thread is employed to effect rapid action, the loss of power is such as to make it difficult to obtain sufficient tension. When a fine thread is employed to effect sufficient tension, the action is too slow. Especially is this latter difficulty apparent when types of screening are employed requiring substantial stretching. The installation of the threaded type of tensioning means requires use of undesirable hardware on the sill of the window frame. If the hardware is made small to minimize its unsightly appearance, it becomes difficult to grip the rotatable member coacting with the threads for tensioning the screen. The same difficulties occur when cams are substituted for the threaded members. When either threads or cams are used, the functions of tensioning the screen and of urging the screen toward the blind stops are separated and require two independent mechanisms to effect these operations.

My invention eliminates these unsatisfactory conditions by placing substantial, initial tension on the screen in one direction only. The tension of the screen is dependent upon the screen web itself or upon the manner in which it is mounted to the frame rather than the frame itself and may be adjusted, if necessary, from season to season. The act of tensioning the screen simultaneously urges it against the blind stop.

My invention reduces the cost of mounting the screening by eliminating substantially all of the expense of building a frame. In addition, with the elimination of the frame the problem of seasonal storage is reduced because the screen may be stored as a compact roll. As so stored, it requires less space and the exposure to possible injury is reduced.

It is, therefore, a primary object of my invention to provide a means for mounting screening eliminating the requirement of a rigid frame, yet capable of simultaneously maintaining the screening in positive sealing contact with the window frame blindstop and of placing it under a positive unidirectional tension.

It is an additional object of my invention to provide a means for mounting screening which may be constructed to remain in closed or window sealing position without the use of special fasteners.

Other objects of my invention are to provide a means for mounting screening low in initial cost, capable of quick compact storage, and adapted to installation by an unskilled person.

Other objects and purposes of my invention will be immediately seen by persons skilled in the art of building construction upon reading the following specification and the accompanying drawings, in which:

Figure 1 is a front elevation view of a window equipped with my improved screen mount.

Figure 2 is a sectional elevation view of a screen mounted by means of my improved screen mount, taken along the plane II—II of Figure 1 and showing the screen in closed position.

Figure 3 is a sectional elevation view of a screen mounted by means of my improved screen mount, taken along the plane II—II of Figure 1 but showing the screen in open position.

Figure 4 is an enlarged view of the upper and lower rails of my improved screen mount taken along the plane IV—IV of Figure 1.

Figure 5 is an enlarged side elevation view of the anchor plate for the upper rail of my improved screen mount.

Figure 6 is an end elevation view of the anchor plate for the upper rail of my improved screen mount.

Figure 7 is an enlarged side elevation view of the lever arm for the lower rail of my improved screen mount.

Figure 8 is an enlarged fragmentary view of the upper end of the lever arm for the lower rail of my improved screen mount viewing said arm as it would be seen from within the window opening.

Figure 9 is an enlarged fragmentary isometric view of one end of the lower rail of my improved screen mount.

Figure 10 is a fragmentary sectional view of the lower end of my improved screen mount taken along the plane X—X of Figure 1.

Figure 11 is an enlarged fragmentary isometric view of the pivotal support for the lever arm of my improved screen mount.

Figure 12 is an enlarged view of the upper anchor plate of my improved screen mount showing the position of the anchor plate at the initiation of installation.

Figure 13 is an enlarged view of the upper anchor plate of my improved screen mount showing the position of the anchor plate when installation is partially completed.

Figure 14 is an enlarged view of the upper anchor plate of my improved screen mount showing the position of the anchor plate at the completion of installation.

Figure 15 is a force diagram of my improved screen mount as it appears when the screen is in closed position.

Figure 16 is a force diagram of my improved screen mount as it appears when the screen is in open position.

Figure 17 is an enlarged side elevation view of a modified form of the lever arm of my improved screen mount.

Figure 18 is an enlarged side elevation view of a modified form for the anchor plate of my improved screen mount.

Figure 19 is an enlarged, sectional view of my improved screen mount adapted for use with a non-elastic web.

Figure 20 is an enlarged, sectional view of a modification of my improved screen mount as adapted for use with a non-elastic web.

Figure 21 is an enlarged, sectional view of a modification of my improved screen mount as adapted for use with a non-elastic web.

Figure 22 is an enlarged, sectional view of a modification of my improved screen mount as adapted for use with a non-elastic web.

In executing the objects and purposes of my invention, I have provided a means for mounting a web of material, such as screening, over a window opening. This mounting means includes a pair of rigid traverse members, one at the top and one at the bottom of the window, with the web of material stretched between them. The web is attached to the inward face of each of the traverse members. The upper traverse member is pivotally and slidably mounted so that the downward pull of the web urges the traverse member to slide tightly against the side blindstop of the window and to rotate its upper edge inwardly toward the top blindstop of the window. The lower traverse member is mounted on the end of a pair of arms, permitting it to swing into and out of the window opening and at the same time apply a tension to the web. As the lower traverse member is pivoted into closed position, it carries the web into the window opening beyond the point of pivotal attachment of the arms to the window frame. In this manner the tension applied to the web urges the lower traverse member further into the window opening. A stop is provided to limit this movement of the lower traverse member.

In the following description the terms "upwardly" and "downwardly" are frequently used and are to be taken to mean "upwardly" in the direction of the top of the window, as shown in Figure 1, and "downwardly" away therefrom.

The terms "inwardly" and "outwardly" are also frequently used and are to be taken to mean "inwardly" toward the interior of a building, that is to the right as shown in Figure 2, and "outwardly" away therefrom.

My improved stileless mounting is described as used to mount screening. This description of my invention is for illustrative purposes only and is not to be taken as limiting. My invention is equally applicable to the mounting of any type of flexible material.

Referring now to the drawings in greater detail, the numeral 1 refers to a rigid frame such as a window frame having a top 2, sill 3 and sides 4. The frame 1 inscribes a window opening 5. The shape of the window opening may be of any conventional design and is not limited to the rectangular shape illustrated in Figure 1.

The upper end of my stileless mount includes a rigid upper rail 6. The upper rail 6 is substantially rectangular in shape and is provided with radiused corners 7 extending parallel to its longitudinal axis. Substantially midway between the short sides of the upper rail 6, a channel 8 parallel to the longitudinal axis of the upper rail is cut in one of the rail's faces. The bottom of the channel 8 is parallel to the face of the upper rail 6 and one side wall 9 of the channel is perpendicular to the bottom of the channel 8. The other side wall 10 of the channel 8 is radiused outwardly from the channel. A rod 11, having a substantially quarter-circle, cross-sectional shape, seats within the channel 8.

The upper rail 6, although described as substantially rectangular, deviates from a true rectangle in that the upper portion 12 of the upper rail on one side of the channel 8 is thicker than the lower portion 13 on the other side of the channel 8 (Fig. 4). Thus, the thickness of the upper rail 6 is greater along the plane A (Fig. 4) than along the plane B. The difference in thickness of the upper rail 6 between the planes A and B is equal to the thickness of the web or screen 40. Thus, the inward surface 41 of the screen 40 lies in the same plane as the inward surface 14 of the upper portion 12 of the upper rail 6. The radiused side wall 10 of the channel 8 extends between the lower portion 13 of the upper rail 6 and the bottom of the channel 8 and provides a smoothly curved seat for the screen 40 when the screen is anchored to the upper rail 6.

A pair of openings 15 extend into the upper rail 6 a substantial distance from each of its ends. The openings 15 are spaced apart a major portion of the greater cross-sectional dimension of the upper rail 6 and, for the purpose of strength, are positioned one on each side of the channel 8.

At each end of the upper rail 6 is an anchor plate 16 (Figs. 1 and 5). Each of the anchor plates 16 has an outline shape corresponding substantially to the cross-sectional shape of the upper rail 6, including the deviation in width between its upper and lower portions. The step 17 in each of the anchor plates is in the inward edge of the plates when the plates are seated in the window. A pair of holes 18 are provided in each of the anchor plates 16, aligned with the openings 15 in the upper rail 6. Each anchor plate is equipped with a blind slot 19 at its lower end. When the anchor plates are in seated position, the open end of the slots 19 project through the outward side of the anchor plate 16 with the slot 19 extending inwardly and downwardly from this opening. The depth of the slot 19 exceeds one-half the width of the anchor plate 16. The slot 19 is surrounded by a channel 20 having a depth constituting a major portion of the thickness of the anchor plate 16. The channel 20 extends outwardly from the slot 19 a sufficient distance to permit the head of a stud to seat within it. When the anchor plates 16 are seated on the ends of the upper rail 6, the open face of the channel 20 abuts and is closed by the end of the upper rail 6. The purpose of the slot 19 and of the channel 20 will appear more fully hereafter.

The lower end of my stileless mounting includes a second rigid member, the lower rail 21, identical in shape and size to the upper rail 6 (Figs. 1 and 4). The lower rail 21 is positioned in a manner identical to that of the upper rail 6, that is, with its thicker portion 22 above the channel 24 and the narrower portion 23 below the channel 24. The purpose of this will appear more fully hereafter. A fastening strip 25 similar in size and shape to the rod 11 seats within the channel 24 of the lower rail 21.

A pair of hangers 26 (Fig. 9) which may be conveniently provided by use of ordinary, flat head nails, extend outwardly from each end of the lower rail 21. The hangers 26, at each end of the lower rail 21, are spaced apart a major portion of the height of the lower rail.

By means of the hangers 26 a lever arm 27 (Figs. 1 and 7) is mounted on each end of the lower rail 21. The lever arms each have a main body portion 27a consisting of a rigid, elongated strip of rectangular cross-section and an L-shaped hook 30 adjacent one end. The hooks 30 (Fig. 10) each have one leg 30a seated against the inward side of the lower rail 21 when the lever arm 27 is installed on the lower rail 21. The inward face 61 of the leg 30a of the hook 30 is in the same plane as the inward edge 62 of the lever arm 27. To accomplish this, the lever arm 27 is provided with a notch 63 in the vicinity of the hook 30.

At the lower end, each of the lever arms 27 is provided with a pair of slots 28 spaced in tandem to align with the hangers 26 on the ends of the lower rail 21. Each of the slots 28 communicates with a circular opening 60 on the end of the slot 28 adjacent the lower end of the lever arm 27. A depression 29, equal in width to the diameter of the opening 60 at the end of the slots 28, surrounds each of the slots 28 and penetrates partially through the thickness of the lever arm 27. The combination of the slots 28 and openings 60 permits the lever arms 27 to be detachably installed on the ends of the lower rail 21 by passing the heads of the hangers 26 through the circular openings 60 and sliding the lever arms 27 until the heads of the hangers 26 are seated in and against the end of the depressions 29.

At its upper end each of the lever arms 27 has a single slot 31, similar in size and shape to the slots 28 but having the circular opening at the upper end of the slot. The depression 32 (Fig. 8) associated with the slot 31 is on the opposite side of the lever arm 27 from that of the depressions 29 surrounding the slots 28. A headed member 33 is provided on each side 4 of the rigid frame 1. The headed members 33 are spaced from the sill 3 a distance such that when the lever arms 27 are in place, adjacent the blind stops 38, and the shanks of the headed members are seated against the lower end of the slots 31, the lower end of the lever arms 27 just clears the sill 3 of the window. The headed members 33 are each spaced outwardly from the blind stop a distance equal to one-half the width of the lever arm 27 plus the thickness of the screen 40. The headed members 33 project into the opening 5 for receiving the upper end of the lever arms 27 by means of the slots 31. When the arms 27 are installed, the head of each of the headed members 33 seats within one of the depressions 32 surrounding the slots 31. By means of the depressions 29 and 32 the heads of the hangers 26 and of the headed members 33 are permitted to seat flush with the surface of the lever arms 27.

The upper and lower rails 6 and 21 may be made of any suitable material such as wood, metal or plastic, so long as the material chosen provides a rigid frame, resistant to weathering and pleasing in appearance. Preferably, the material should be wood because it may be trimmed to length and the various attachments necessary may be added to it by the average householder using only those few tools normally found in a home tool kit. The anchor plates 16 and lever arms 27 are fabricated from metal, preferably steel, to provide the necessary strength and rigidity. The screen 40 may be of any material or design so long as it is flexible. The screen 40 used with the type of stileless frame described above must be longitudinally elastic. However, in the hereinafter described modification of my stileless frame, non-elastic screening material may be employed. In the above-described form of my stileless frame elasticity in the screen is necessary to permit the stretching incident to provide the desired tension. The material may be a combination sun and insect screen either of woven construction or having elastic warp threads, or it may be a plastic insect screen or cloth or other suitable material. By this description I intend only to suggest examples of suitable materials but not to limit myself to these materials alone.

*Installation*

The upper rail 6 is cut to a length equal to that of the window opening 5 less the thickness of the two anchor plates 16. The lower rail 21 is cut to a length equal to that of the window opening 5 less the thickness of the two lever arms 27.

A strip of screen or web 40 is provided of such length that when it has been attached to the upper and lower rails 6 and 21 the distance between the upper edge of the upper rail 6 and the lower edge of the lower rail 21 is slightly less than the distance between the top 2 and the sill 3 of the frame 1. The web is attached to the upper rail 6 by seating it within the channel 8 and securing it in position by means of the rod 11. The rod 11 is installed by means of screws, nails or other suitable fastening means with its curved face directed toward the radiused side wall 10 of the channel 8 to form a funnel shaped opening between the radiused wall 10 and the rod 11. The web 40 enters the channel 8 through the funnel shaped opening whereby whichever way it extends away from the upper rail 6 it is supported by a smoothly curved surface. These smoothly curved surfaces protect the web against injury such as would result from a sharp corner, particularly when the screen 40 is placed under tension. The screen 40 is anchored in a similar manner to the lower rail 21 by means of the fastening strip 25.

The pivots 36, which may be headed nails or screws, are installed adjacent the upper end of the window. These pivots 36 support the upper rail 6 and are each equipped with a head designed to seat in the channel 20. The spacing of the pivots 36 from the top 2 is such that the upper rail 6 may be rotated upwardly against the blind stops with sufficient clearance between the upper rail and the top 2 to prevent any binding. The anchor plates 16 are next installed on the ends of the upper rail 6 by means of nails or screws driven into the openings 15 with their heads seated flush with the raised portion defining the channel 20.

The upper rail with the anchor plates attached is installed in the window opening 5 by hanging it upon the pivots 36. The method of engaging the anchor plates 16 and the pivots 36 is shown in Figs. 12, 13 and 14. The upper rail 6 is first rotated to a position in which the slot 19 is substantially vertical with its open end extending downwardly as shown in Fig. 12. The upper rail 6 is moved downwardly, without rotation, to engage the pivots 36 with the closed end of the slot 19. Upon upward rotation of the upper rail 6, as shown in Fig. 13, the upper rail 6 is retained in a position in which the pivots 36 engage the closed end of the slot 19. As the upper rail 6 approaches its vertical or seated position, the upper rail 6 moves toward the blind stop 38, moving the closed ends of the slots 19 a short distance inwardly from the pivots 36 (Fig. 14). The downward slope of the slots 19 urges the upper rail 6 inwardly, thereby forcing the upper rail 6 snugly against the blind stops 38 to seal the upper portion of the window opening 5. The resulting downward displacement of the upper rail 6 creates a small gap between the upper rail and the top 2 of the window opening 5. However, this downward displacement is actually small and the inward surface 14 of the rail bears against the top member of the blind stops 38 to effectively seal the window.

The lower end of my stileless screen mounting is assembled by driving the hangers 26 into each end of the lower rail 21. The lever arms 27 are then attached by passing the hangers 26 through the circular openings 60 at the ends of the slots 28 and moving the arms relatively to the lower rail 21 to seat the shanks of the hangers 26 against the ends of the slots 28 with the heads of the hangers in the depressions 29.

The upper end of each of the arms 27 is mounted on one of the headed members 33 by means of the slots 31. Mounting the arms 27 on the headed members 33 completes the installation of the screen structure. The screen 40 is moved into seated position in the window opening by pivoting the lower rail 21 downwardly and inwardly about the headed members 33. The act of pivoting the lower rail places a unidirectional tension on the screen 40, drawing it smoothly and evenly across the window opening 5. The width of the screen 40 is such that as the lower rail 21 is pivoted inwardly, the screen may pass between the lever arms 27 without contacting either of them. At the same time, the screen 40 is wide enough to provide a substantial overlap on the blind stops 38 on each side of the window.

Operation

When the screen is open, that is, with the lower rail 21 in the outwardly pivoted position shown in Fig. 3, the screen 40 is not under tension. The lower rail 21 is stationary in this position because the screen 40 is slightly shorter than the window opening 5, and in this position the screen 40 will support the weight of the lower rail 21. As the lower rail 21 is pivoted on the arms 27 toward the window opening, the distance between the upper rail 6 and the lower rail 21 is increased. Since the screen 40 is designed to be slightly shorter than the distance between its points of attachment to the upper rail 6 and lower rail 21 when the rails are aligned vertically, the inward movement of the lower rail 21 stretches the screen 40, placing it under tension.

The tension placed on the screen 40 by the movement of the lower rail 21 will automatically seat the upper rail 6, if it has not been previously seated. If the upper rail 6 is left in the outwardly pivoted position shown in Fig. 13, the downward pull effected by the screen 40 will cause it to rotate and press tightly against the blind stops 38. This rotation results from the design of the upper rail and the manner in which the screen 40 is attached to the upper rail 6. The screen is anchored to the upper rail 6 substantially above, when the upper rail is in seated position, the pivotal mounting of the upper rail 6 to the sides 4 of the window. The screen extends downwardly from this anchor point adjacent the inward face of the upper rail. The body of the upper rail maintains the screen 40, at all times, an appreciable distance inwardly of the point of pivotal mounting of the upper rail. This spacing is indicated as the moment arm 153 (Figs. 15 and 16) between the pivots 36 and the point 154 of force application to the upper rail 6 by the screen 40 (shown as line 150 in Figs. 15 and 16). Thus, the downward pull of the screen 40 always creates a clockwise moment, as viewed in Figs. 12, 13 and 14 about the pivots 36 which moment is increased when the upper rail reaches its vertical, seated position and moves bodily inwardly to increase the distance between the point of application of the downward pull and pivots 36. Thus, the greater the tension imposed upon the screen 40 the tighter the upper rail 6 will bear against the blind stops 38.

The use of the slot 19 in the anchor plates 16 permits the upper rail 6 to slide toward the blind stops 38. The downward and inward inclination of this slot causes this inward movement to occur under the downward urging of the screen 40. The relocation of the upper rail 6, resulting from this design, although slight, is important to the proper functioning of my invention. By permitting the lower end of the upper rail to adjust itself toward the blind stops 38, the entire upper rail is caused to press against the blind stops 38 rather than just the top edge. This forces the inward surface 41 of the screen 40 against the blind stops 38 effecting a tight seal between these parts. This seal is something heretofore never accomplished by stileless screens without either the addition of parts or special shaping of the screen itself such as by crimping its edges inwardly. Since the inward surface 41 of the screen 40 and the inward surface 14 of the upper rail 6 are in the same plane, the automatic inward adjustment of the upper rail 6 brings both of these surfaces into effective sealing contact with the blind stops 38.

The screen installation, once the lower rail 21 has been seated against the blind stops 38, will remain in closed position without the necessity of any hooks or other anchoring means. This characteristic of my invention also arises from the particular way it is designed. At a point slightly outwardly of the blind stops 38, the line 150 (Figs. 15 and 16), defining the vertical plane of the tensioned screen 40, moves inwardly past a line 151 passing through the headed members 33 and the hangers 26. When this occurs, the moment about the headed members 33, generated by the pull of the screen 40, reverses and the lower rail, instead of being urged outwardly away from the blind stops 38 is urged inwardly toward them. The blind stops limit the inward movement of the lower rail 21.

The attachment of the screen 40 to the inward side of both the upper rail 6 and the lower rail 21 serves two purposes, since it places the screen 40 between these rails and the blind stops 38, thereby assuring a sealing contact between these rails and the blind stops. In addition, however, by moving the points 152 and 154 at which the pull of the screen 40 is applied to the inward face of the lower rail 21 and the upper rail 6, respectively, the line 150, defined by the plane of the screen 40, is moved correspondingly inwardly. Thus, the reversal of the direction of the moment about the headed members 33 is caused to occur before the lower rail 21 contacts the blind stops.

This construction causes the screen to seal the window and stay in place without the necessity of any hooks or other fasteners. When the screen is closed from inside the window the hooks 30 serve as handles by which the rail 21 may be pulled inwardly. If it is desired to lock the screen in place, catches 50 may be provided on the bottom 3 of the window frame 1 to engage an eye opening 51 in the end of the hooks 30. The legs 30a of the hooks 30 do not prevent the lower rail 21 from forcing the screen 40 against the blind stops 38. The legs 30a seat in a gap created between the inward surface of the lower or narrow portion 23 of the lower rail 21 by a combination of the offset in thickness between the upper or thick portion 22 and the narrow portion 23 of the lower rail 21 and the thickness of the screen 40 which lies between the thick portion 22 of the lower rail and the blind stops 38. Although the legs 30a do not occupy the entire gap thus created, an effective seal against insects exists since the lever arms 27 occupy the space between the ends of the lower rail 21 and the sides 4 of the window opening.

The screen 40, installed as above-described, provides a screened window, sealed against insects. Since the screen 40 is forced tightly against the blind stops 38 at both the top and the bottom and is unidirectionally tensioned between the upper and lower rails, the edges 52 of the screen will seat tightly against the blind stops 38 throughout their length. This sealing action is accentuated by the fact that the screen 40 may be placed under substantial tension, evenly applied across the entire width of the screen web. By means of the lever arm arrangement, the mechanical advantage of a toggle is obtained. The use of the lever arms 27 permits a substantial tension load to be placed on the screen with little effort by the operator. Furthermore, there is no problem of initially engaging the tensioning mechanism and the screen rail such as occurs when threaded or cam action arrangements are employed. The threaded, cam and other tension mechanisms, moreover, fail to provide an effective means of both tensioning the screen and urging it against the blind stop. Although they may accomplish one or the other separately, they have so far failed to combine these functions.

The length of the lever arms 27 may vary throughout a wide range between the lower edge of the upper rail 6 and the upper edge of the lower rail 21. However, if they are too short the mechanical leverage, the ease of operation and overall efficiency of the screen will be detrimentally affected. Preferably they should have a length between eight and ten inches for the most desirable results. Theoretically they could be extended to pivot, at their upper ends, about the same stud upon which the upper rail is mounted. This, however, is an undesirable arrangement since it will cause the tension on the screen to increase as the lower rail is moved outwardly and will necessitate the initial installation of the screen under tension.

My stileless screen frame, once the frame has been initially installed, is quick and simple to remove and reinstall. The screen may be removed by releasing the tension by pivoting the lower rail 21 outwardly; disengaging the lever arms 27 from the headed members 33; rotating the upper rail 6 until it can be disengaged from the pivots 36. The screen can be reinstalled by mounting the upper rail 6 on the pivots 36, mounting the lever arms 27 on the headed members 33, and pivoting the lower rail 21 against the blind stops 38. In each case the steps are few, simple, and require no tools of any kind.

The lever arms 27 are quickly and easily removable from the lower rail 21 by simply disengaging them from the hangers 26. Once the lever arms 27 have been removed, the screen 40, with the rails attached, may be rolled into a compact bundle for storage, using one of the rails as a core. The radiused corners 7 of the rails permits the screen 40 to be thus rolled without damage due to creasing against sharp corners. As so rolled, all the screens used on an average size house may be stored in substantially the same area required for a single screen having a conventional frame. By making the handle for pulling the screen into place, integral with the lever arms 27 as is accomplished by the hooks 30, the removal of the lever arms 27 removes all hardware which could damage the screen when it is rolled for storage.

A screen installed by means of my stileness frame has increased air passage efficiency over screens installed by means of the conventional, box-type frame. By elimination of the stiles or side members, the entire width of the window opening between the blindstops is left free for air flow. The upper and lower rails of my stileless screen frame do not occupy any more of the area of the window opening than is blocked by the corresponding members of the conventional, box-type frame.

*Modifications*

Both the anchor plates 16 and the lever arms 27 may be modified to make them serve not only for their primary purposes but also as templates for the installation of my stileless screen. When modified to serve as templates, the necessity for making accurate measurements is eliminated and installation may be made by any unskilled person.

The modified anchor plate 100 (Fig. 13) is identical to the anchor plate 16 except for the addition of the slot 101 and the hole 102. The slot 101 extends outwardly from the inward edge of the anchor plate 100 at the point where the upper or wider portion joins the lower or narrower portion. It replaces the step 17 of anchor plate 16.

The hole 102 is adjacent the upper end of the anchor plate 100. It is spaced from the periphery of the anchor plate the same distance as the blind end of the slot 19 and is spaced the same distance inwardly from the outward edge of the anchor plate as the slot 19.

The slot 101 and hole 102 make the anchor plate 100 a template for the anchor plate's installation. The anchor plate 100 is turned end for end so that its normally upper end is on the bottom. It is then seated against the side 4 of the window opening 5 with its upwardly projecting end just clearing the top 2 of the frame 1 and its inwardly directed edge bearing against the blind stop 38. In this position, the hole 102 is positioned where the pivot 36 should be installed on the frame 1. The position of the pivot 36 may be marked by any suitable tool and the anchor plate 100 removed. The pivot 36 can then be installed and the proper spacing of the head of the pivot 36 from the frame 1 can be obtained by seating the slot 101 around the shank of the pivot and driving the pivot until the head rests upon the face of the anchor plate 100. The placing of the hole 102 in the wide portion of the anchor plate 100 assures proper spacing of the pivot 36 from the blind stop 38 to permit the anchor plate 100, when installed, to seat vertically.

The lever arms may be redesigned to serve as a template for their installation as shown in Fig. 17. The modified lever arm 110 is identical to the lever arm 27 except that the upper end of the lever arm, adjacent the slot 31, is provided with a radiused tab 111 on its inward edge. The tab 111 projects from the lever arm 110 approximately the thickness of the screen 40. The lever arm 110 is placed in the window opening 5 with its lower end just clearing the sill 3 and with the tab 111 touching the blind stop 38. The head member 33 may then be driven with its shank in the lower end of the slot 31. With the anchor plates 100 and lever arms 110 operating as templates, an unskilled operator may install my stileless screen frame. No special alignment or tools are necessary.

My stileless frame may be adapted for use with a web or screen which is flexible but not elastic. To modify my stileless screen for this application, it is necessary to incorporate the resiliency required for proper tensioning into the means by which the screen is attached to the rails. This may be accomplished by several types of structure.

The non-elastic screen 40a may be attached to the rail 200 by means of a formed section 201 (Fig. 19). The rail 200 is identical to the rails 6 and 21. The formed section 201 is a section shaped to seat into the channel of one of the rails of my stileless screen. One end of the section is extended as a leg 202 to fit over the radius wall of the channel. The other end of the section loops into the channel and coils upon itself to form a hook 203. The end of the screen is crimped to engage the hook 203.

The section 201 is fastened to the rail 200 by nails 204 or other suitable fastening means engaging the leg 202. The section 201 is made from a strong metal capable of resisting substantial pull by the screen 40a but resilient enough to temporarily deflect under this pull. When tension is placed upon the screen 40a, the section 201 resists the screen 40a but because of its shape it partially uncoils and as it uncoils the section increases its resistance to the pull of the screen 40a. Whether the screen 40a pulls back against the coil or in the opposite direction toward the leg 202, the uncoiling of the section pushes the straight arm 205 of the section 201 against the wall of the rail 200, thus, increasing the frictional engagement between the section 201 and the rail 200. This prevents the section 201 from becoming dislodged from the channel.

The section 201 may be replaced by a pair of spirals 206 (Fig. 20). These spirals may be formed of the same material as the section 201 because they have to have the same physical characteristics. The screen 40a is attached to the rail 200a at the bottom of the channel in such a manner that it may extend outwardly from the channel substantially midway between the sides of the channel. The rail 200a is identical to the rail 200 except that the straight wall of the channel is provided with a small radius because of the small diameter of the spirals 206. If the rail is modified to make the channel shallower so that the diameter of the coils 206 equals the depth of the channel, then the additional radius may be eliminated. A spiral 206 is placed in the channel on each side of the screen 40a. Thus, as the screen 40a is pulled in either direction from the rail 200, it presses against one of the spirals 206, compressing it when the tension on the screen 40a reaches predetermined limits. The spirals 206 coil upon themselves under the pull of the screen 40a. The spirals 206 are attached to the rail 200a at the bottom of the channel by nails or other suitable fasteners through the legs 207 of each of the spirals 206.

The metallic section 201 or the spirals 206 may be replaced by a pair of rubber or resilient plastic support members 208 cemented to the rail 200a (Fig. 21). These support members 208 may consist of a tubular section or a solid but spongy section. When the support members 208 are used, the screen 40a is mounted in a manner identical to that when the spirals 206 are used. The operation of the support member 208, so far as permitting the rails to be separated and the screen 40a to be tensioned, is identical to that of the spirals 206 except that instead of contraction by coiling, the contraction results from the inherent compressibility of the material itself.

In Fig. 22 the idea of a compressible mounting to permit use of a non-elastic screen is carried out by means of a pair of quarter-round rubber or resilient plastic moldings 209. When the moldings 209 are employed, the rail 210 is preferably modified to eliminate the radiused wall of the channel. This change in the shape of the channel is not essential; however, it is preferable to provide the moldings 209 with adequate support. The moldings 209 may be attached to the rail 210 in any suitable manner such as by cement.

In each case where a non-elastic screen is employed and the resilience necessary to place the screen under a tension and to maintain it under tension, is obtained by means of the type of mounting employed, the length of the screen remains constant but a small length of the screen is payed out to permit the separation of the upper and lower rails. This additional length of screen is obtained by compressing the member over which the screen passes as it leaves the channel. By this compression, the total path traced by the screen is shortened and, thus, more of the over-all length of the screen is available for permitting the upper and lower rails to separate. The compressible mounting may be used at either end or both ends of the screen, depending upon the amount of elongation desired.

It is also possible to redesign my stileless screen frame so that there is no reversal of the moment about the headed members 33. This may be accomplished by moving the headed members closer to the blind stops or attaching the screen to the upper and lower rails outwardly of a point midway between the inward and outward faces of these rails whereby the plane of the screen 40 does not pass inwardly of the headed members. A stileless frame so constructed would have to be held in place by means of some type of fastener such as a hook or latch. Such a design does not improve the operation of my invention and, in addition, eliminates one of its most novel and desirable features.

These and other modifications of my invention may be made, such as mounting the screen or web horizontally across the window opening or in the precise manner in which the various parts of my stileless screen are fastened together. Each of these modifications and others, however, are to be considered as included in the hereinafter appended claims unless these claims by their language expressly provide otherwise.

I claim:

1. A mounting for a web of elastic material within a rigid frame defining an opening therethrough, said mounting comprising: a rigid first rail affixed to one end of said web and a rigid second rail affixed to the other end of said web; said first rail mounted at each of its ends within and at one end of said opening; an arm affixed to each end of said second rail, each of said arms pivotally mounted, on the end thereof removed from said second rail, to said frame within said opening and between said first and second rails; said web, in released position, having a length slightly less than the distance between said rails when said rails are at their maximum spacing whereby said web is tensioned as said second rail is moved to a position of maximum spacing from said first rail; said web, when said second rail is in the position of maximum spacing from said first rail, defining a line between said rails spaced outwardly from the point of pivotal attachment of said arm to said frame in a direction toward said frame whereby the elasticity of said web will urge said second rail into said opening; means on said frame limiting movement of said second rail into said opening.

2. A mounting for a window screen of elastic material for the opening defined by a window frame, said window frame having blind stops, the improvement in said opening comprising: a rigid first rail affixed to one end of said screen and a rigid second rail affixed to the other end of said screen; anchor means on said frame on each side of and within said opening adjacent one end of said opening; said first rail pivotally mounted at each end on said anchor means; pivot means on said frame on each side of, projecting into, and substantially removed from each end of said opening; an arm affixed to each of the ends of said second rail; each of said arms pivotally mounted on the end thereof removed from said second rail on one of said pivot means; said screen in released position having a length slightly less than the distance between said rails when said rails are at their maximum spacing whereby said screen is tensioned as said second rail is moved to a position of maximum spacing from said first rail; said screen, in one position, tracing a substantially straight path between said first and second rails, said path spaced outwardly from said pivot means in a direction away from said opening whereby said tensioned screen urges said second rail away from said opening, and in another position said screen tracing a substantially straight path, said path spaced from said pivot means in a direction toward said opening whereby said tensioned screen urges said second rail toward said opening; said blind stops limiting movement of said second rail toward said opening.

3. A mounting for a window screen of elastic material for the opening defined by a window frame, the improvement in said mounting comprising: said screen at one of its ends affixed to the face adjacent said opening of a rigid first rail and on the other of its ends affixed to the face adjacent said opening of a rigid second rail; an anchor plate on each end of said first rail; the walls of said anchor plates defining a blind slot adjacent the ends, directed toward said screen, of said anchor plates; said blind slots having their open ends directed away from said screen and said slots inclined from said open end at a substantial angle toward said screen; stud means on said frame on each side of and within said opening adjacent one end of said opening; said blind slots each pivotally and slidably engaging one of said stud means for supporting said first rail; pivots on said frame, one of said pivots on each side of, projecting into, and substantially removed from each end of said opening; an arm affixed to each of the ends of said second rail; each of said arms rotatably mounted on the end thereof removed from said second rail on one of said pivots; said screen, in released position, having a length slightly less than the distance between said rails when said rails are at their maximum spacing whereby said screen is tensioned as said second rail is moved to a position of maximum spacing from said first rail; said tension urging the edge away from said screen, of said first rail to rotate about said anchor means toward said opening and said first rail to slide toward said opening; said screen, in one position, tracing a substantially straight path between said rails, said path spaced outwardly from said pivots in a direction away from said opening whereby said tensioned screen urges said second rail away from said opening and in another position said screen tracing a substantially straight path, said path spaced from said pivot means in a direction toward said opening whereby said tensioned screen urges said second rail toward said opening with the said screen between said first and second rails and across said opening and abutting said blind stops; said blind stops limiting movement of said second rail and screen toward said opening.

4. Means for mounting a web of elastic material to a rigid window frame, said means comprising: means for anchoring one of the ends of said web to said frame; a rigid rail attached to the other of the ends of said web at a point substantially removed from said one end of said web; an arm attached on one of its ends to said rail; means for pivotally mounting said arm at the other of its ends to said frame at a point between said one end of said web and said rail for movement toward and away from said one anchored end of said web; said web in released position having a length slightly less than the distance between said rail and said one anchored end whereby said web is tensioned when said rail is moved to its maximum spacing from said one anchored end of said web; said web in one position of said rail defining a substantially straight path, said path spaced outwardly from said point of pivotal mounting of said arm to said frame in a direction away from said frame whereby said tensioned web urges said web away from said frame and in another position said web traces a substantially straight path spaced from said point of pivotal mounting of said arm to said frame in a direction toward said frame whereby said tensioned web urges said web toward said frame; means on said frame for limiting movement of said rail and web toward said frame.

5. A stileless frame for mounting an elastic web to a window frame defining an opening therethrough and having pivot means between the ends of said opening, said frame comprising: a first rail mountable at one end of said opening for supporting one end of said web; a second rail for supporting the other of the ends of said web; a pair of elongated arms, each mountable at one of their ends to said second rail; said elongated arms on the ends thereof remote from said second rail rotatably mountable on said pivot means whereby said second rail may be pivotally moved into and out from said opening and toward and away from said first rail for alternately pulling and slackening said web between said first and second rails; said web, when said second rail is out of said opening, adapted to define a substantially straight path, said path spaced from said pivot means in a direction away from said window frame and, when said second rail is in said opening, said web spaced from said pivot means in a direction toward said window frame; means on said window frame for limiting movement of said second rail and said web toward said frame.

6. A bracket for pivotally mounting one end of a window covering, said bracket comprising: a plate having a substantially rectangular upper portion integral with a substantially rectangular lower portion of lesser traverse dimension; one longitudinal wall of said plate defining a straight line and an opening therethrough adjacent the lower end thereof and the other longitudinal wall of said bracket defining a step therein substantially midway between the ends of said bracket; the walls of said lower portion defining a blind slot communicating with said opening through said straight wall and inclined downwardly away from said opening more than one-half the width of said plate.

7. Means for mounting one end of a web of flexible material to a rigid frame, said means comprising: a rigid rail affixed to one end of said web; a plate affixed to said rail at each of the ends of said rail, the longitudinal axis of said plate, in operating position, extending in a vertical plane; the wall of said plate away from said rigid frame defining an opening and a blind slot communicating with said opening and inclined downwardly away from said opening more than one-half the width of said plate; pivot means on said rigid frame for engaging the blind slot in each of said plates, whereby said rail may be rotated until said opening and blind slot are directed downwardly for initiating engagement of said rail and said pivot means and thereafter said rail may be rotated about said pivot means toward said rigid frame and move relative to said pivot means toward said rigid frame.

WALKLEY B. EWING.

REFERENCES CITED

The following references are of record in the file of this patent:

UNITED STATES PATENTS

| Number | Name | Date |
| --- | --- | --- |
| 554,958 | Schrenkeisen | Feb. 18, 1896 |
| 788,869 | Wheeler | May 21, 1905 |
| 812,262 | Dunkle | Feb. 13, 1906 |
| 1,030,985 | Edler | July 2, 1912 |
| 1,099,959 | Wylie | June 16, 1914 |
| 1,405,083 | Wilson | Jan. 31, 1922 |
| 1,518,441 | Nowell | Dec. 9, 1924 |
| 1,624,181 | Rapp | Apr. 12, 1927 |
| 1,630,416 | Clementi | May 31, 1927 |
| 1,732,628 | Baribault | Oct. 22, 1929 |
| 1,757,017 | Matovitz | May 6, 1930 |
| 1,792,184 | Racette | Feb. 10, 1931 |
| 1,987,080 | Schneider | Jan. 8, 1935 |
| 2,194,774 | Spencer | Mar. 26, 1940 |
| 2,255,581 | Ewing | Sept. 9, 1941 |

FOREIGN PATENTS

| Number | Country | Date |
| --- | --- | --- |
| 90 | Great Britain | Jan. 2, 1905 |
| 11,790 | Australia | Feb. 16, 1928 |